United States Patent
Vasseur et al.

(10) Patent No.: US 9,860,140 B2
(45) Date of Patent: Jan. 2, 2018

(54) DYNAMICALLY ADJUSTING A SET OF MONITORED NETWORK PROPERTIES USING DISTRIBUTED LEARNING MACHINE FEEDBACK

(71) Applicant: Cisco Technology, Inc., San Jose, CA (US)

(72) Inventors: Jean-Philippe Vasseur, Saint Martin d'Uriage (FR); Grégory Mermoud, Veyras (CH); Sukrit Dasgupta, Norwood, MA (US)

(73) Assignee: Cisco Technology, Inc., San Jose, CA (US)

( * ) Notice: Subject to any disclaimer, the term of this patent is extended or adjusted under 35 U.S.C. 154(b) by 1123 days.

(21) Appl. No.: 13/941,063

(22) Filed: Jul. 12, 2013

(65) Prior Publication Data
US 2014/0222996 A1    Aug. 7, 2014

Related U.S. Application Data

(60) Provisional application No. 61/761,118, filed on Feb. 5, 2013.

(51) Int. Cl.
*G06F 15/16* (2006.01)
*H04L 12/26* (2006.01)
*H04L 12/24* (2006.01)

(52) U.S. Cl.
CPC .............. *H04L 43/02* (2013.01); *H04L 41/16* (2013.01); *H04L 43/103* (2013.01); *Y04S 40/168* (2013.01)

(58) Field of Classification Search
CPC ........ H04L 41/16; H04L 43/02; H04L 43/103

USPC ......................................................... 709/224
See application file for complete search history.

(56) References Cited

U.S. PATENT DOCUMENTS

| | | | |
|---|---|---|---|
| 7,076,695 B2 * | 7/2006 | McGee ............... | G06F 11/0709 702/179 |
| 2009/0254606 A1 * | 10/2009 | Power ..................... | H04L 12/24 709/203 |
| 2011/0238606 A1 * | 9/2011 | Ide .......................... | G06F 17/18 706/12 |

FOREIGN PATENT DOCUMENTS

EP        1705833        * 3/2006

OTHER PUBLICATIONS

Barlet-Ros. Predictive Resource Management of Multiple Monitoring Applications. IEEE/ACM Transactions on Networking, vol. 19, No. 3, Jun. 2011.*

(Continued)

*Primary Examiner* — Bryan Lee
(74) *Attorney, Agent, or Firm* — Parker Ibrahim & Berg LLC; James M. Behmke; Stephen D. LeBarron (57) ABSTRACT

In one embodiment, techniques are shown and described relating to dynamically adjusting a set of monitored network properties using distributed learning machine feedback. In particular, in one embodiment, a learning machine (or distributed learning machines) determines a plurality of monitored network properties in a computer network. From this, a subset of relevant network properties of the plurality of network properties may be determined, such that a corresponding subset of irrelevant network properties based on the subset of relevant network properties may also be determined. Accordingly, the computer network may be informed of the irrelevant network properties to reduce a rate of monitoring the irrelevant network properties.

19 Claims, 5 Drawing Sheets

(56) References Cited

OTHER PUBLICATIONS

Dasgupta, et al., "A Pre-Processing Framework Component of Distributed Intelligence Architectures", U.S. Appl. No. 61/761,124, filed Feb. 5, 2013, 30 pages, U.S. Patent and Trademark Office.
Vasseur, et al., "Learning Machine Based Detection of Abnormal Network Performance", U.S. Appl. No. 61/761,117, filed Feb. 5, 2013, 39 pages, U.S. Patent and Trademark Office.
Vasseur, et al., "Dynamically Adjusting a set of Monitored Network Properties Using Distributed Learning Machine Feedback", U.S. Appl. No. 61/761,118, filed Feb. 5, 2013, 24 pages, U.S. Patent and Trademark Office.
Winter, et al., "RPL: IPv6 Routing Protocol for Low-Power and Lossy Networks", Request for Comments 6550, Mar. 2012, 157 pages, Internet Engineering Task Force Trust.
Barlet-Ros, et al., "Predictive Resource Management of Multiple Monitoring Applications", IEEE/ACM Transactions on Networking, vol. 19, No. 3, Jun. 2011, pp. 788-801, New York, NY.
Finnie, et al., "Notification of Transmittal of the International Search Report and the Written Opinion of the International Searching Authority, or the Declaration", Patent Cooperation Treaty, International Appl. No. PCT/US2014/014698, dated May 8, 2014, 13 pages, European Patent Office, Rijswijk, Netherlands.
Fu, et al., "Network Anomaly Detection Based on Projection Pursuit Regression", 9th IEEE International Symposium on Parallel and Distributed Processing with Applications Workshops, May 2011, pp. 16-20, IEEE, Busan, South Korea.
Ting, et al., "Variational Bayesian Least Squares: An Application to Brain-Machine Interface Data", Neural Networks, vol. 21, No. 8, Oct. 2008, pp. 1112-1131, Elsevier Science Publishers, Barking, Great Britain.

\* cited by examiner

DYNAMICALLY ADJUSTING A SET OF MONITORED NETWORK PROPERTIES USING DISTRIBUTED LEARNING MACHINE FEEDBACK

RELATED APPLICATION

The present invention claims priority to U.S. Provisional Application Ser. No. 61/761,118, filed Feb. 5, 2013, entitled "DYNAMICALLY ADJUSTING A SET OF MONITORED NETWORK PROPERTIES USING DISTRIBUTED LEARNING MACHINE FEEDBACK", by Vasseur, et al., the contents of which are incorporated herein by reference.

TECHNICAL FIELD

The present disclosure relates generally to computer networks, and, more particularly, to the use of learning machines within computer networks.

BACKGROUND

Low power and Lossy Networks (LLNs), e.g., Internet of Things (IoT) networks, have a myriad of applications, such as sensor networks, Smart Grids, and Smart Cities. Various challenges are presented with LLNs, such as lossy links, low bandwidth, low quality transceivers, battery operation, low memory and/or processing capability, etc. The challenging nature of these networks is exacerbated by the large number of nodes (an order of magnitude larger than a "classic" IP network), thus making the routing, Quality of Service (QoS), security, network management, and traffic engineering extremely challenging, to mention a few.

Machine learning (ML) is concerned with the design and the development of algorithms that take as input empirical data (such as network statistics and states, and performance indicators), recognize complex patterns in these data, and solve complex problems such as regression (which are usually extremely hard to solve mathematically) thanks to modeling. In general, these patterns and computation of models are then used to make decisions automatically (i.e., close-loop control) or to help make decisions. ML is a very broad discipline used to tackle very different problems (e.g., computer vision, robotics, data mining, search engines, etc.), but the most common tasks are the following: linear and non-linear regression, classification, clustering, dimensionality reduction, anomaly detection, optimization, association rule learning.

One very common pattern among ML algorithms is the use of an underlying model M, whose parameters are optimized for minimizing the cost function associated to M, given the input data. For instance, in the context of classification, the model M may be a straight line that separates the data into two classes such that M=a*x+b*y+c and the cost function would be the number of misclassified points. The ML algorithm then consists in adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data. Note that the example above is an over-simplification of more complicated regression problems that are usually highly multi-dimensional.

Learning Machines (LMs) are computational entities that rely on one or more ML algorithm for performing a task for which they haven't been explicitly programmed to perform. In particular, LMs are capable of adjusting their behavior to their environment (that is, "auto-adapting" without requiring a priori configuring static rules). In the context of LLNs, and more generally in the context of the IoT (or Internet of Everything, IoE), this ability will be very important, as the network will face changing conditions and requirements, and the network will become too large for efficiently management by a network operator. In addition, LLNs in general may significantly differ according to their intended use and deployed environment.

Thus far, LMs have not generally been used in LLNs, despite the overall level of complexity of LLNs, where "classic" approaches (based on known algorithms) are inefficient or when the amount of data cannot be processed by a human to predict network behavior considering the number of parameters to be taken into account.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, techniques are shown and described relating to dynamically adjusting a set of monitored network properties using distributed learning machine feedback. In particular, in one embodiment, a learning machine (or distributed learning machines) determines a plurality of monitored network properties in a computer network. From this, a subset of relevant network properties of the plurality of network properties may be determined, such that a corresponding subset of irrelevant network properties based on the subset of relevant network properties may also be determined. Accordingly, the computer network may be informed of the irrelevant network properties to reduce a rate of monitoring the irrelevant network properties.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

Figure 1:
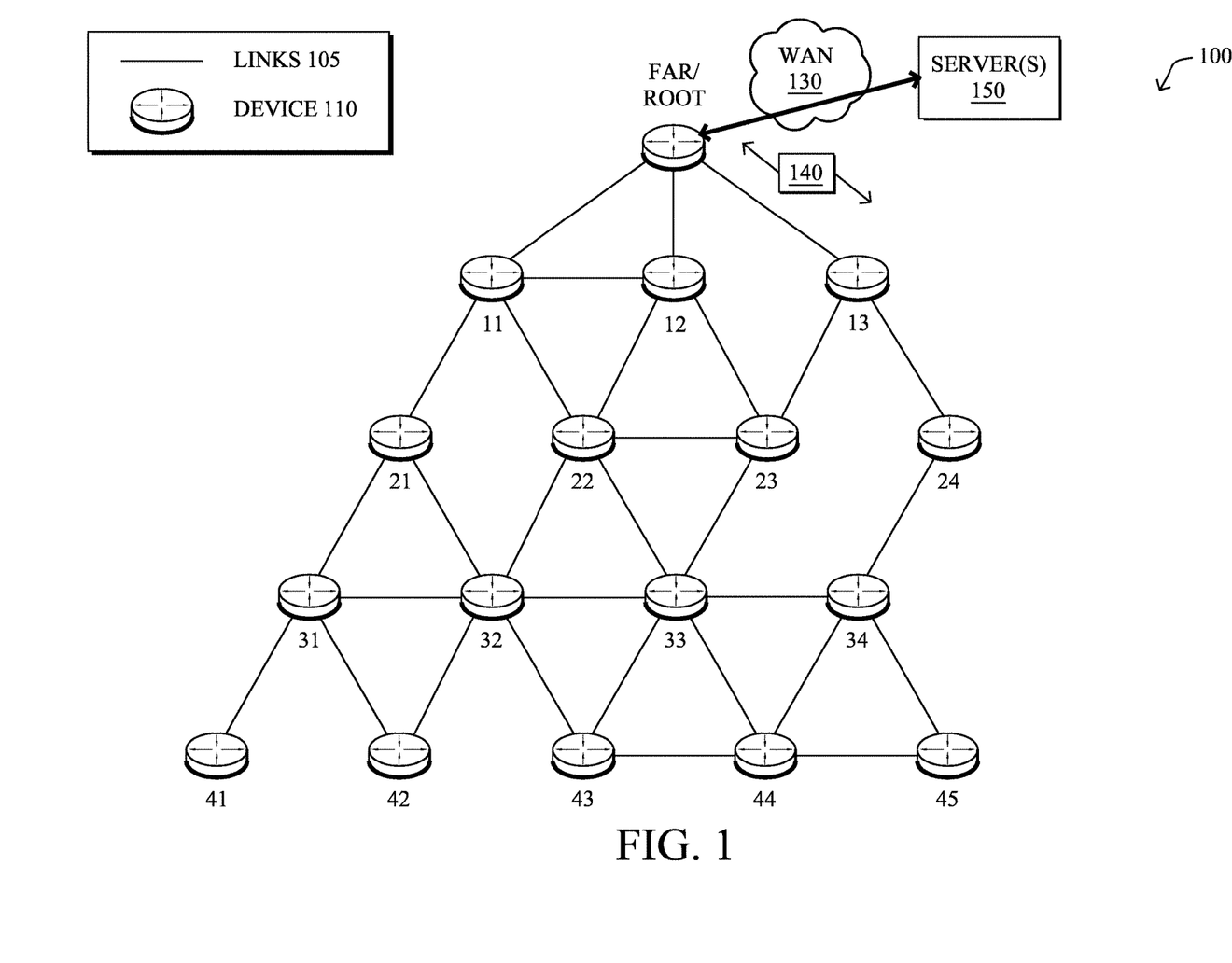
FIG. 1 illustrates an example communication network.

FIG. 1 is a schematic block diagram of an example computer network 100 illustratively comprising nodes/devices 110 (e.g., labeled as shown, "root," "11," "12," . . . "45," and described in FIG. 2 below) interconnected by various methods of communication. For instance, the links 105 may be wired links or shared media (e.g., wireless links, PLC links, etc.) where certain nodes 110, such as, e.g., routers, sensors, computers, etc., may be in communication with other nodes 110, e.g., based on distance, signal strength, current operational status, location, etc. The illustrative root node, such as a field area router (FAR) of a FAN, may interconnect the local network with a WAN 130, which may house one or more other relevant devices such as management devices or servers 150, e.g., a network management server (NMS), a dynamic host configuration protocol (DHCP) server, a constrained application protocol (CoAP) server, etc. Those skilled in the art will understand that any number of nodes, devices, links, etc. may be used in the computer network, and that the view shown herein is for simplicity. Also, those skilled in the art will further understand that while the network is shown in a certain orientation, particularly with a "root" node, the network 100 is merely an example illustration that is not meant to limit the disclosure.

Data packets 140 (e.g., traffic and/or messages) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
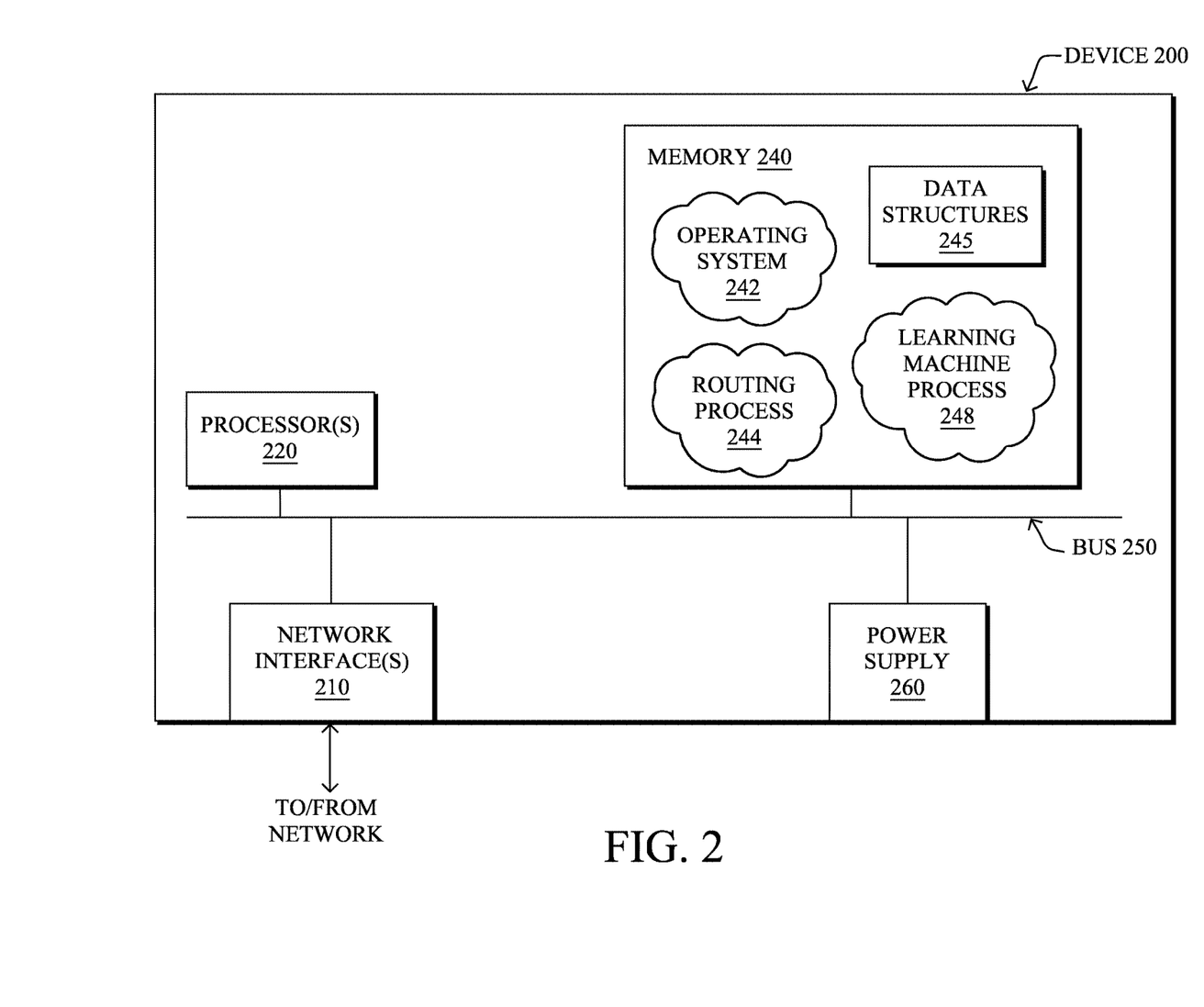
FIG. 2 illustrates an example network device/node.

FIG. 2 is a schematic block diagram of an example node/device 200 that may be used with one or more embodiments described herein, e.g., as any of the nodes or devices shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC (where the PLC signal may be coupled to the power line feeding into the power supply) the network interface 210 may communicate through the power supply 260, or may be an integral component of the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise a routing process/services 244 and an illustrative "learning machine" process 248, which may be configured depending upon the particular node/device within the network 100 with functionality ranging from intelligent learning machine algorithms to merely communicating with intelligent learning machines, as described herein. Note also that while the learning machine process 248 is shown in centralized memory 240, alternative embodiments provide for the process to be specifically operated within the network interfaces 210.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Notably, mesh networks have become increasingly popular and practical in recent years. In particular, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

An example implementation of LLNs is an "Internet of Things" network. Loosely, the term "Internet of Things" or "IoT" (or "Internet of Everything" or "IoE") may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs), FARs, or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

Also, a directed acyclic graph (DAG) is a directed graph having the property that all edges are oriented in such a way that no cycles (loops) are supposed to exist. All edges are contained in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Note also that a tree is a kind of DAG, where each device/node in the DAG generally has one parent or one preferred parent. DAGs may generally be built (e.g., by a DAG process and/or routing process 244) based on an Objective Function (OF). The role of the Objective Function is generally to specify rules on how to build the DAG (e.g. number of parents, backup parents, etc.).

Figure 3:
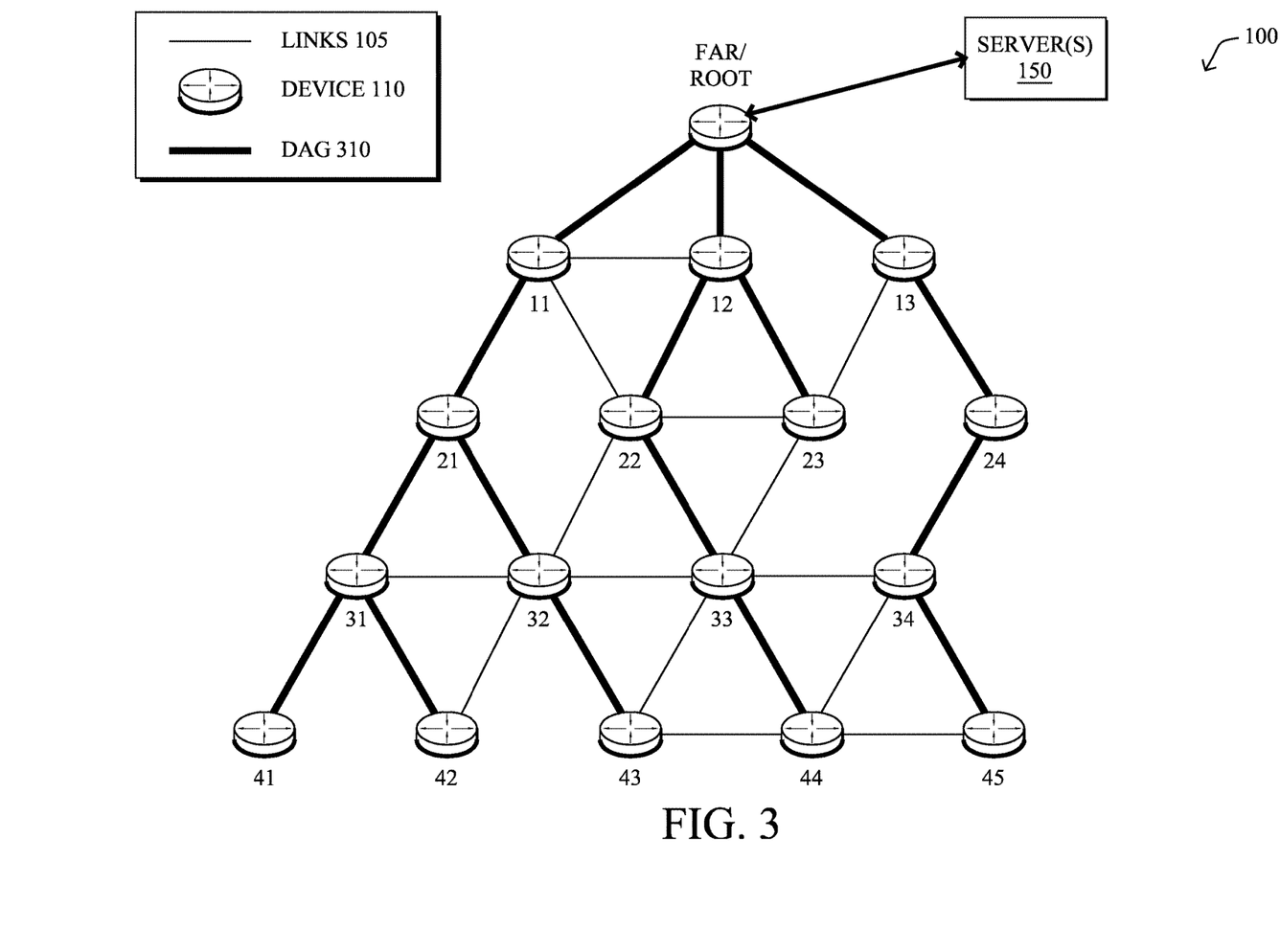
FIG. 3 illustrates an example directed acyclic graph (DAG) in the communication network of FIG. 1.

FIG. 3 illustrates an example simplified DAG that may be created, e.g., through the techniques described above, within network 100 of FIG. 1. For instance, certain links 105 may be selected for each node to communicate with a particular parent (and thus, in the reverse, to communicate with a child, if one exists). These selected links form the DAG 310 (shown as bolded lines), which extends from the root node toward one or more leaf nodes (nodes without children). Traffic/packets 140 (shown in FIG. 1) may then traverse the DAG 310 in either the upward direction toward the root or downward toward the leaf nodes, particularly as described herein.

Learning Machine Technique(s)

As noted above, machine learning (ML) is concerned with the design and the development of algorithms that take as input empirical data (such as network statistics and state, and performance indicators), recognize complex patterns in these data, and solve complex problem such as regression thanks to modeling. One very common pattern among ML algorithms is the use of an underlying model M, whose parameters are optimized for minimizing the cost function associated to M, given the input data. For instance, in the context of classification, the model M may be a straight line that separates the data into two classes such that M=a*x+b*y+c and the cost function would be the number of misclassified points. The ML algorithm then consists in adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

As also noted above, learning machines (LMs) are computational entities that rely one or more ML algorithm for performing a task for which they haven't been explicitly programmed to perform. In particular, LMs are capable of adjusting their behavior to their environment. In the context of LLNs, and more generally in the context of the IoT (or Internet of Everything, IoE), this ability will be very important, as the network will face changing conditions and requirements, and the network will become too large for efficiently management by a network operator. Thus far, LMs have not generally been used in LLNs, despite the overall level of complexity of LLNs, where "classic" approaches (based on known algorithms) are inefficient or when the amount of data cannot be processed by a human to predict network behavior considering the number of parameters to be taken into account.

Currently, techniques consist of: 1) statically configuring the set of relevant networking properties to monitor, using a management information base (MIB) with simple network management protocol (SNMP) or CoAP in the case of LLNs in order to monitor the network behavior and performance (e.g., routing, link loads); 2) retrieving all the information on the NMS; 3) analyzing one or more specific network performance metrics (referred to as $M_i$) such as the quality of service (QoS) or the time for a node $n_i$ to join the network; and 4) finding a correlation (e.g., based on 3) between the metric of interest $M_i$ and the properties of $n_i$ (noted $x_i$). Said differently, current techniques use a centralized approach to perform network monitoring and troubleshooting, constructing a model in order to evaluate a performance metric (e.g., the path delay) according to a set of monitored data (routing tree, link reliability, etc.).

Up to several years ago, 4) was performed manually by networking experts. With the increase in complexity of existing networks, it became required to use various techniques (analytics) to process a wide range of $x_i$ and perform correlation between a given set of $x_i$ and $M_i$. Such correlation is needed in order to build a network performance metric model, and determine whether $M_i$ is normal or abnormal, thus leading to root cause analysis. Note that root cause analysis is one of the main challenges in monitoring, troubleshooting, and configuring complex networks.

In U.S. Provisional Patent Application Ser. No. 61/761,117, entitled "Learning Machine Based Detection of Abnormal Network Performance", filed by Vasseur et al. on Feb. 5, 2013, the contents of which are hereby incorporated by reference in their entirety, an architecture is specified involving a set of distributed learning machines collaborating with the NMS so as to compute a regression function F mapping a network performance metric with a set of observed network properties so as to detect anomalies that are signaled to the NMS. Other Learning Machine-based strategies for feature selection may be adopted that would still allow for the determination of the set of "relevant" monitored network properties to compute a regression function anomaly detection and root cause analysis.

Regardless of the architecture used that may either be distributed (such as in U.S. Provisional Patent Application Ser. No. 61/761,117) or centralized (using analytics with a centralized Learning Machine should the network provide enough bandwidth to centrally collect all network properties), it is still currently required to manually configure on the NMS the set of network properties to monitor (e.g., using the CoAP protocol). Considering the vast number of network properties that may be available on end devices (location, nature of the node, rank in the routing topology, level of power, link quality, routing stability, link layer information, etc., to mention a very few) or via a pre-processing layer (such as the one specified in U.S. Provisional Patent Application Ser. No. 61/761,124, entitled "A Pre-Processing Framework Component of Distributed Intelligence Architectures", filed by Vasseur et al. on Feb. 5, 2013) statically configuring the set of required network properties to monitor is extremely cumbersome.

The techniques herein, therefore, propose a set of mechanisms that takes advantage of the dynamic computation of the set of relevant features by the Learning Machine (LM) in order to dynamically tune the set of monitored network properties on the NMS that must be monitored in addition to the set of nodes for which additional metric values are required. In particular, the techniques herein dynamically modify the set of monitored network properties, which is in contrast with current approaches where an arbitrary set of properties are monitored by the NMS (and configured on the node). A first component allows for notifying the NMS of the set of irrelevant network properties, leading the NMS to dynamically configure the various nodes (and/or the pre-processing layer) in the network to only retrieve the relevant network properties. This first component is a radical shift with current approaches since the network itself determines which network properties must be monitored in order to monitor the set of network performance metrics of interest. A second component allows for dynamically adjusting the set of nodes and the frequency at which additional measured data are required instead of retrieving the properties x of all nodes at the same frequency, which contrasts with current approaches.

Illustratively, the techniques described herein may be performed by hardware, software, and/or firmware, such as in accordance with the learning machine process 248, which may contain computer executable instructions executed by the processor 220 (or independent processor of interfaces 210) to perform functions relating to the techniques described herein, e.g., optionally in conjunction with other processes. For example, certain aspects of the techniques herein may be treated as extensions to conventional protocols, such as the various communication protocols (e.g., routing process 244), and as such, may be processed by similar components understood in the art that execute those protocols, accordingly. Also, while certain aspects of the techniques herein may be described from the perspective of a single node/device, embodiments described herein may be performed as distributed intelligence, also referred to as edge/distributed computing, such as hosting intelligence within nodes 110 of a Field Area Network in addition to or as an alternative to hosting intelligence within servers 150.

One of the tasks performed by an end user (e.g., administrator) consists in configuring the set of network properties monitored using the CoAP protocol. As already pointed out, U.S. Provisional Patent Application Ser. No. 61/761,117 proposes a new architecture involving a collaborative model between the NMS in charge of statically configuring the set of network properties to be transmitted by the end node and notifying a (distributed) LM that is responsible for computing a regression function F with various features for inputs (deducted from network properties). One of the properties of some inference algorithms (e.g., Variational Bayes Least Square (VBLS)) is the ability to determine the set of irrelevant networking properties. Note that other algorithms can be used that provide a similar functionality, and the techniques herein are not tied to U.S. Provisional Patent Application Ser. No. 61/761,117. A property is considered as irrelevant if the property has no significant statistical influence on the quantities inferred by the algorithm, that is, the property is not used to build the regression function F. In other words, for the sake of illustration, if a network property $x_i$ is not used in the modified version of the VBLS algorithm proposed in U.S. Provisional Patent Application Ser. No. 61/761,117, the modified VBLS algorithm would assign a weight close to zero.

Operationally, a first component of the techniques herein allows for a substantial change in network management strategy. Indeed, instead of arbitrarily monitoring a set of network properties that are (with current approaches) statically configured (e.g., node ranks, links quality, number of time routing metrics are dynamically adjusted, routing and QoS strategies, etc.), the techniques herein may use the output of the $LM_d$ module (e.g., the vector b that determines the weight of each feature f( ) in U.S. Provisional Patent Application Ser. No. 61/761,117) so as to determine the set of relevant network properties. In other words, if the function F does not make use of a network property $x_j$, then it has been qualified as irrelevant for the metric M. The techniques herein specify a newly defined IPv6 message called MP (Monitoring Property) sent by the distributed/centralized LM to the NMS that comprises the following set of information:

1) A Back List B that lists the set of irrelevant properties per metric of interest M; note that a given property $x_i$ is irrelevant if and only if it is not used by any of the regressions functions computed by the LM (indeed, the LM may be in charge of estimating more than one metrics M); and
2) Optionally a period of time may be specified should the LM suggest to stop monitoring $x_i$ for a specific amount of time.

Said differently, removing monitored network property (inputs) allows for a reduction of the problem space dimensionality. Consequently this information is used by the NMS in order to dynamically adjust the set of monitored features, thanks to a newly generated CoAP message.

A second component of the techniques herein monitors the stability of the network property for a given node $n_i$ by estimating a measure of the variability (e.g., variance) of $x_i$ over a moving time-window. If the variance is low, one may ask the NMS to diminish the rate at which node i is pushing $x_i$. This is different from adjusting the rate of metric collection. Here, the techniques adjust the rate of property collection. To that end, the techniques herein specify a newly defined message that can either be sent to the metric collector (that may be co-located in the FAR, or in a different server) or to the NMS (should the NMS host the metric collector or interact with it), where the message specifies:

The list of nodes <N1, . . . , Nm>; and
The frequency at which $x_i$ are required in addition to (optionally) a period of time for the new rate to be applied.

Figure 4:
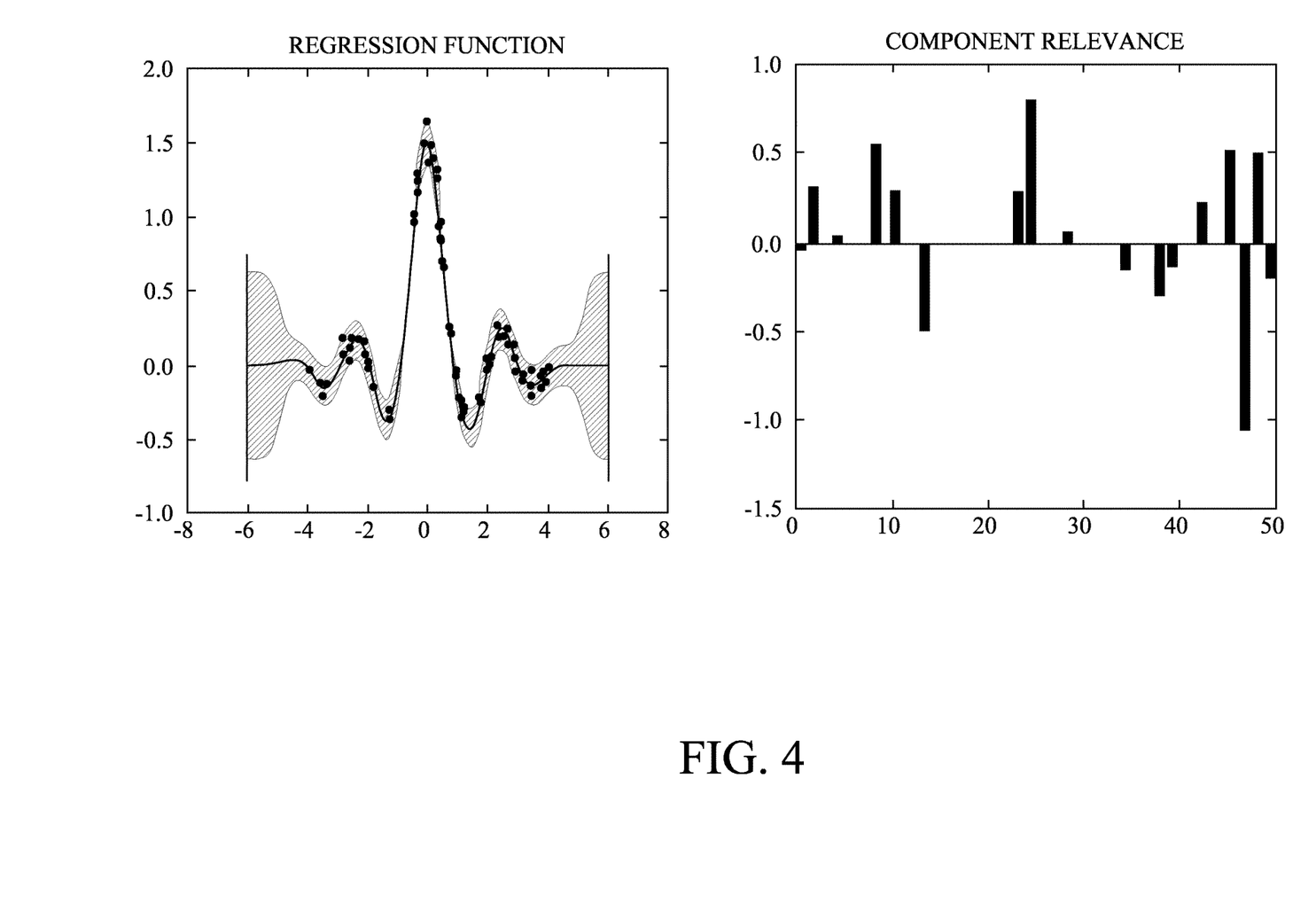
FIG. 4 illustrates an example regression function and component relevance.

VBLS-RVM (relevance vector machine) is a clear illustration of the ability of VBLS to select only relevant features. VBLS-RVMs use the input data as features, and the regression function is built as a linear combination of distance functions (also called kernels). In other words, the function maps any new input data x as a weighted sum of its distance to each prior data point $x_i$. Typically, the distance function is some Gaussian-like function whose value decreases exponentially with the Euclidean distance. As a result, among all priori data points, only a few are truly relevant to construct the regression function. This is more evident in clusters of data for which only one point (generally close the barycenter of the cluster) needs to be retained to represent the influence of this particular group of data points on the overall function. FIG. 4 illustrates this phenomenon: the left-hand side depicts the estimation of strongly non-linear data using VBLS-RVM, and the right-hand side shows the relevance of the various components (which, again, are the input data shown on the left hand-side). As can be seen from the latter graph, out of an illustrative 50 components, only a few of them are retained by VBLS-RVM (the others being set to zero).

Figure 5:
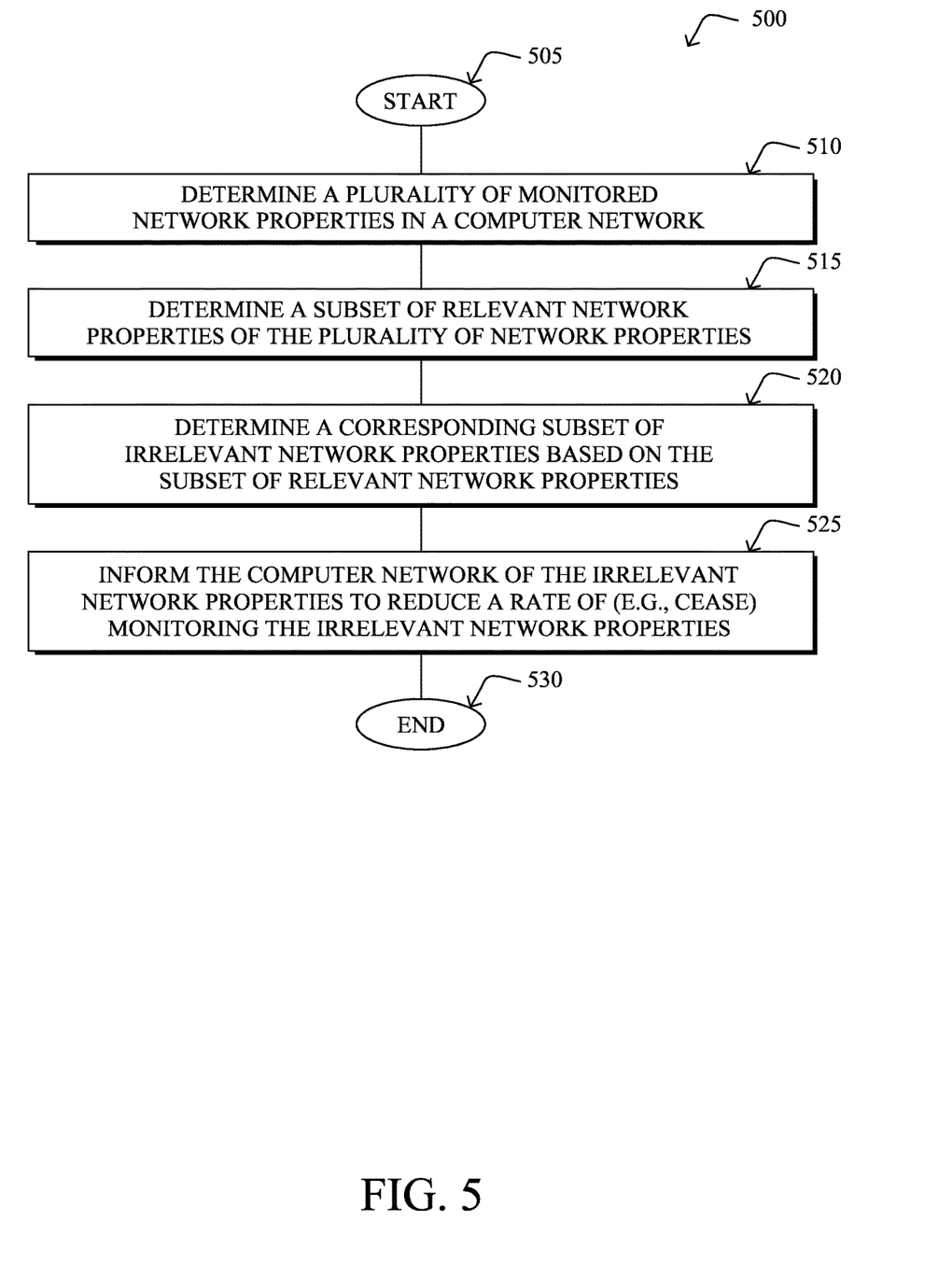
FIG. 5 illustrates an example simplified procedure for dynamically adjusting a set of monitored network properties using distributed learning machine feedback.

FIG. 5 illustrates an example simplified procedure 500 for dynamically adjusting a set of monitored network properties using distributed learning machine feedback in accordance with one or more embodiments described herein. The procedure 500 may start at step 505, and continues to step 510, where, as described in greater detail above, a learning machine (or distributed learning machines) determine a plurality of monitored network properties in a computer network.

In step 515, a subset of relevant network properties of the plurality of network properties may be determined. For instance, the relevant network properties may be those used in a learning machine inference algorithm, (e.g., VBLS), or those used to compute a regression function F mapping a network performance metric to a corresponding set of monitored network properties. Accordingly, in step 520, the learning machine(s) may determine a corresponding subset of irrelevant network properties based on the subset of relevant network properties. For example, the determined subset of irrelevant network properties may comprises network properties not used in the inference algorithm, or else assigned a weight below a particular threshold for the inference algorithm (e.g., a weight of zero), as described above. Alternatively or in addition, network properties that have a value variance above a given threshold may be determined (that is, whose values change substantially), where irrelevant network properties have a value variance below the given threshold (that is, don't change often).

In step 525, the learning machine(s) may inform the computer network of the irrelevant network properties to reduce a rate of (e.g., cease) monitoring the irrelevant network properties, such as by informing a network management server (NMS) responsible for informing the computer network, which then informs the network. Notably, in one or more embodiments herein, the informing step may also indicate a particular period of time for which the rate of monitoring is to be reduced.

The procedure 500 illustratively ends in step 530, though may continue to monitor network properties and adjust the collection of relevant and/or irrelevant network properties in any of the steps above. It should be noted that while certain steps within procedure 500 may be optional as described above, the steps shown in FIG. 5 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for dynamically adjusting a set of monitored network properties using distributed learning machine feedback. In particular, the techniques herein allow for dynamically determining the list of required monitored network properties (instead of existing "brute force" approaches), thus reducing the amount of data required to monitor specific network performance, a major issue in LLNs. Additionally, the amount of control traffic is further reduced when possible and increased when required (since the LM requires more information) making the monitoring model significantly more efficient.

While there have been shown and described illustrative embodiments that provide for dynamically adjusting a set of monitored network properties using distributed learning machine feedback, it is to be understood that various other adaptations and modifications may be made within the spirit and scope of the embodiments herein. For example, the embodiments have been shown and described herein with relation to LLNs and related protocols. However, the embodiments in their broader sense are not as limited, and may, in fact, be used with other types of communication networks and/or protocols. In addition, while the embodiments have been shown and described with relation to learning machines in the specific context of communication networks, certain techniques and/or certain aspects of the techniques may apply to learning machines in general without the need for relation to communication networks, as will be understood by those skilled in the art.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
    determining, by a learning machine, a plurality of monitored network properties in a computer network;
    determining, by the learning machine, a subset of relevant network properties of the plurality of network properties;
    determining, by the learning machine, a corresponding subset of irrelevant network properties based on the subset of relevant network properties, wherein the corresponding subset of irrelevant network properties are properties that are not being used to build a learning machine inference algorithm; and
    notifying, by the learning machine, a network management server (NMS) in the computer network of the irrelevant network properties, the notification causing the NMS to dynamically reduce a rate of monitoring for the irrelevant network properties.

2. The method as in claim 1, wherein reducing the rate is ceasing monitoring the irrelevant network properties.

3. The method as in claim 1, wherein informing further comprises:
    indicating a period of time for which the rate of monitoring is to be reduced.

4. The method as in claim 1, wherein determining the subset of relevant network properties comprises:
    determining one or more network properties used to compute a regression function mapping a network performance metric to a corresponding set of monitored network properties.

5. The method as in claim 1, wherein determining the subset of relevant network properties comprises:
    determining one or more network properties used in the learning machine inference algorithm.

6. The method as in claim 5, wherein the inference algorithm is a Variational Bayes Least Square (VBLS) algorithm.

7. The method as in claim 5, wherein the determined subset of irrelevant network properties comprises network properties not used in the inference algorithm.

8. The method as in claim 5, wherein the determined subset of irrelevant network properties comprises network properties assigned a weight below a particular threshold for the inference algorithm.

9. The method as in claim 8, wherein the weight is zero.

10. The method as in claim 1, wherein determining the subset of relevant network properties comprises:
    determining one or more network properties that have a value measure of variability above a given threshold, wherein irrelevant network properties have a value measure of variability below the given threshold.

11. An apparatus, comprising:
    one or more network interfaces to communicate within a computer network;
    a processor coupled to the network interfaces and adapted to execute one or more processes; and
    a memory configured to store a process executable by the processor, the process when executed operable to:
        determine, as a learning machine, a plurality of monitored network properties in a computer network;
        determine, as the learning machine, a subset of relevant network properties of the plurality of network properties;
        determine, as the learning machine, a corresponding subset of irrelevant network properties based on the subset of relevant network properties, wherein the corresponding subset of irrelevant network properties are properties that are not being used to build a learning machine inference algorithm; and
        notify, as a learning machine, a network management server (NMS) in the computer network of the irrelevant network properties, the notification causing the NMS to dynamically reduce a rate of monitoring for the irrelevant network properties.

12. The apparatus as in claim 11, wherein reducing the rate is ceasing monitoring the irrelevant network properties.

13. The apparatus as in claim 11, wherein the process when executed to inform is further operable to:
    indicate a period of time for which the rate of monitoring is to be reduced.

14. The apparatus as in claim 11, wherein the process when executed to determine the subset of relevant network properties is further operable to:
    determine one or more network properties used to compute a regression function mapping a network performance metric to a corresponding set of monitored network properties.

15. The apparatus as in claim 11, wherein the process when executed to determine the subset of relevant network properties is further operable to:
    determine one or more network properties used in the learning machine inference algorithm.

16. The apparatus as in claim 15, wherein the determined subset of irrelevant network properties comprises network properties not used in the inference algorithm.

17. The apparatus as in claim 16, wherein the determined subset of irrelevant network properties comprises network properties assigned a weight below a particular threshold for the inference algorithm.

18. The apparatus as in claim 11, wherein the process when executed to determine the subset of relevant network properties is further operable to:
    determine one or more network properties that have a value measure of variability above a given threshold, wherein irrelevant network properties have a value measure of variability below the given threshold.

19. Logic encoded in one or more non-transitory tangible media for execution and when executed by a machine operable to:
- determine, as a learning machine, a plurality of monitored network properties in a computer network;
- determine, as the learning machine, a subset of relevant network properties of the plurality of network properties; and
- determine, as the learning machine, a corresponding subset of irrelevant network properties based on the subset of relevant network properties wherein the corresponding subset of irrelevant network properties are properties that are not being used to build a learning machine inference algorithm; and
- notify, as a learning machine, a network management server (NMS) in the computer network of the irrelevant network properties, the notification causing the NMS to dynamically reduce a rate of monitoring for the irrelevant network properties.

* * * * *